United States Patent [19]
Cristovici et al.

[11] Patent Number: 5,427,607
[45] Date of Patent: Jun. 27, 1995

[54] PROCESS FOR THE RECOVERY OF METALLIC IRON FROM SLAGS AND OTHER RESIDUES

[75] Inventors: Marius A. Cristovici, Ottawa; Salustio Guzman, St. Bruno; Mickey M. Raicevic, Orleans; Micheline Boisclair, Gatineau, all of Canada

[73] Assignee: Her Majesty the Queen in right of Canada as represented by the Minister of Energy, Mines and Resources, Ottawa, Canada

[21] Appl. No.: 337,217

[22] Filed: Nov. 7, 1994

[51] Int. Cl.[6] .............................................. C21D 7/06
[52] U.S. Cl. .................................... 75/749; 75/962; 241/14; 241/24
[58] Field of Search .................... 75/342, 749, 962; 241/14, 24

[56] References Cited

U.S. PATENT DOCUMENTS

| 644,180 | 2/1900 | Lane | 241/14 |
| 2,971,703 | 2/1961 | Rath | 241/24 |
| 4,190,422 | 2/1980 | Hitzrot | 75/962 |

*Primary Examiner*—Peter D. Rosenberg
*Attorney, Agent, or Firm*—Robert Wilkes; Robert Hendry

[57] ABSTRACT

A process for the recovery of at least a major proportion of the useful metallic iron values in small sized ferrous slags and drosses in which the slags and drosses are subjected to at least one grinding step in a wet grinding mill. Depending on the size of the slag and dross particles, either a peripheral end discharge rod mill or an axial discharge ball mill is used. In a preferred configuration, two wet grinding stages are used, comprising a peripheral end discharge rod mill followed by a ball mill. Products with different metallic iron contents are recovered by interposing screens with suitably sized openings between and after the grinding mills. This process makes it possible to recover at least about 80% of the metallic iron in the feed material.

12 Claims, 1 Drawing Sheet

PROCESS FOR THE RECOVERY OF METALLIC IRON FROM SLAGS AND OTHER RESIDUES

BACKGROUND OF THE INVENTION

This invention relates to the recovery of useful and valuable amounts of iron, and other ferrous alloys, from metal bearing slags and drosses, such as are produced in a steel making plant.

It is well known that in the metallurgical processes used by the steel industry whereby both iron in its usual forms, and various ferrous alloys of greater and lesser complexity are prepared, in addition to the required metals, significant quantities of drosses and slags are also inevitably obtained. Drosses and slags of one form and another are obtained whenever iron, steel, and the various ferrous alloys are handled in a molten state. Thus in addition to being obtained in smelting and alloying processes, these materials are also obtained in casting processes.

The production of these slag and dross materials both cannot be avoided, and represents a potential metal loss to the steel maker, as these materials contain significant amounts of iron, or of ferrous alloys, in the form of trapped metal associated with the oxidic and other materials in the dross or slag, usually derived from furnace slag and fluxing materials used during the handling of the molten metal. For environmental reasons, it is no longer possible for these slag and dross materials simply to be dumped, as has been done in the past. Furthermore, the ever increasing cost of both raw materials and of plant operation, make it necessary for the steel furnace operator, either in smelting to make metal or in a foundry using metal, to minimise metal losses. Although adequate methods exist for dealing with large particle size materials, which are mainly metallic, problems are still encountered in dealing with small particle size materials.

Over the years many and various proposals have been made for dealing with materials of this kind. Generally, most of these methods utilize essentially two steps: the material is comminuted to a smaller size by a dry grinding or crushing step, and then a magnetic separation step is applied to the crushed materials. Where large lumps are concerned, for example Rath, in U.S. Pat. No. 2,971,703, discloses a process in which the screen sizes provide materials ranging from passing 12" inch (approx 300 mm) to passing ⅛th inch (approx 3 mm), the difference in friability of the dross or slag encapsulating the metallic particles appears to be controlling. All of the processes of this type of which Applicants are aware utilize dry crushing or grinding steps.

In certain cases, including silver and copper, it is known that the metal occurs in nature not only in the form of an oxide or sulphide ore, but also as native impure metal intimately associated to a greater or lesser degree with gangue in the form of rock. Lane, in U.S. Pat. No. 644,180 (issued February, 1900), describes a similar approach to recovering the metal from such metal/gangue mixtures. The Lane procedure relies on the fact that these metals are all malleable, and therefore are easily deformed. In essence, Lane proposes to crush the gangue containing native metal in such a way that the gangue is broken up, and the particles of freed metal are flattened out. To achieve a good level of separation, Lane advocates several roller crushing machines be used, in which the rock is sequentially broken down into smaller size pieces. As a consequence largely of the different response of the metal and of the gangue to the crushing forces, the two can be separated by screening. The screens following each roller crusher are sized so that the crushed gangue passes the screen, whilst the flattened out metal particles do not. The feasibility of this process, as Lane points out, depends entirely upon the fact that the native metal being recovered is malleable.

Procedures such as those described by Lane when applied to the finer sizes of ferrous slags and drosses have been found not to be workable. These materials are not amenable to crushing in conventional small size roll crushers. When such materials are fed to the crusher the metal containing particles instead of either being crushed or flattened out, simply jam the rollers. The difficulty is that the ferrous metal present simply is nowhere near malleable enough to respond to such treatment. For such methods to work, the amount of force provided between the rolls in the roll crusher has to be extremely high: this means that the power consumption of such a crusher will be enormous, and the crusher itself has to be built to withstand extreme levels of force. Although the construction of such machinery is theoretically possible; in practice it is easier and more economical to seek alternative ways of achieving the same end, namely to recover at least a major proportion of the metallic values present in these small size materials.

By "small size" in this context is meant ferrous metal containing slag and dross materials typically which will have particles below 12.5 mm in size, with substantial amounts smaller than 1.7 mm, and ranging down to about 0.3 mm.

SUMMARY OF THE INVENTION

This invention seeks to provide a simple process wherein these ferrous metal containing small particle size drosses and slags may be treated to recover at least a major proportion of the useful metallic values therein, without resorting to the use of massive roll crushers. Quite surprisingly, it has been found that if the conditions are arranged properly within a continuous wet grinding mill, then the metal and its attached dross, slag, or the like, can be separated into two fractions of essentially different size and shape, in which the metal values are obtained as flattened shapes, and the remainder as smaller broken particles. These fractions can then be separated by suitable screening techniques, since the flattened shapes can be retained on a screen which will pass the remainder of the ground material. By the application of a sequence of continuous wet grinding stages combined with suitable screening stages, a major proportion of the metal values present are recovered in a form that is suitable for reprocessing by a steel maker. Since the water used is conveniently recycled, the only byproduct obtained is a tailing sand of small particle size, and of significantly reduced free metal content.

As is the case with the earlier dry crushing methods, the process of this invention is conveniently applied in several steps, with the particle size being reduced in a somewhat stepwise fashion. In each stage a wet grinding step is followed by a wet separation step in which a metal bearing fraction is separated before the remaining dross material is subjected to further comminution.

In these wet grinding steps, particularly while the particle size is toward the upper end of the size range that this process is intended to handle, the path of the materials through the wet mill needs careful consideration. In the common through flow ball mill, the feed slurry containing both the material to be ground, and a suitable amount of water enters the mill chamber essentially at the centre of one end, commonly by way of a hollow shaft supporting the body of the mill. The exit from the mill is constructed similarly, the outflow being through a second hollow supporting shaft, in the centre of the other end of the mill.

This standard and commonly used method has the advantage that the dwell time in the mill is readily controllable, and the grinding medium such as balls is easily retained in the mill.

This method has the disadvantage that the ground material has to be light enough, or small enough (which is effectively the same thing) to be carried out of the mill with the axial outflow of water. Experiment has shown that flattened ferrous metal particles above about 2 mm in size (that is, flattened particles which are retained on a 2 mm sieve) are too heavy to be lifted out with the water in a axial discharge mill, and merely accumulate in the mill. In the process according to this invention, this difficulty is overcome by using a peripheral end discharge mill, in which the feed is axial, and the discharge is arranged to be radial or peripheral.

In a broad aspect this invention seeks to provide a process for recovering ferrous metal values present as the free metal in small particle size furnace slags, drosses and the like which comprises:

(a) feeding the ferrous metal containing material and a suitable amount of water to a grinding mill to provide a slurry;

(b) subjecting the slurry to wet milling in a first grinding mill for a time sufficient both to convert at least a first proportion of the metal present into flattened particles, and to comminute the remainder of the feed material into particles smaller than the first proportion of flattened particles;

(c) discharging the ground slurry from the mill;

(d) separating the first proportion of flattened metal particles from the remainder of the solids in the slurry by at least a first screening step, to provide at least a first metal product fraction and a first reject fraction having a reduced level of contained metal;

(e) subjecting the first reject fraction to steps (a) through (d) in a second wet grinding mill and obtaining from a second screening step a second metal product fraction and a second reject fraction;

(f) repeating step (e) to provide further metal product fractions until the metal level in the associated reject fraction is reduced below a desired level; and (g) subjecting the last reject fraction to a further screening step to provide a last metal product fraction and a reject residue.

Preferably, the process is operated continuously, and each of the wet grinding mills are constructed and arranged to discharge flattened metal product particles continuously to the screens used in the screening steps.

Preferably, the metal content of the last reject fraction is less than about 5% by weight.

Preferably, the combined metal product fractions contain at least about 80% by weight of metallic iron.

DESCRIPTION OF A PREFERRED EMBODIMENT

Figure 1:
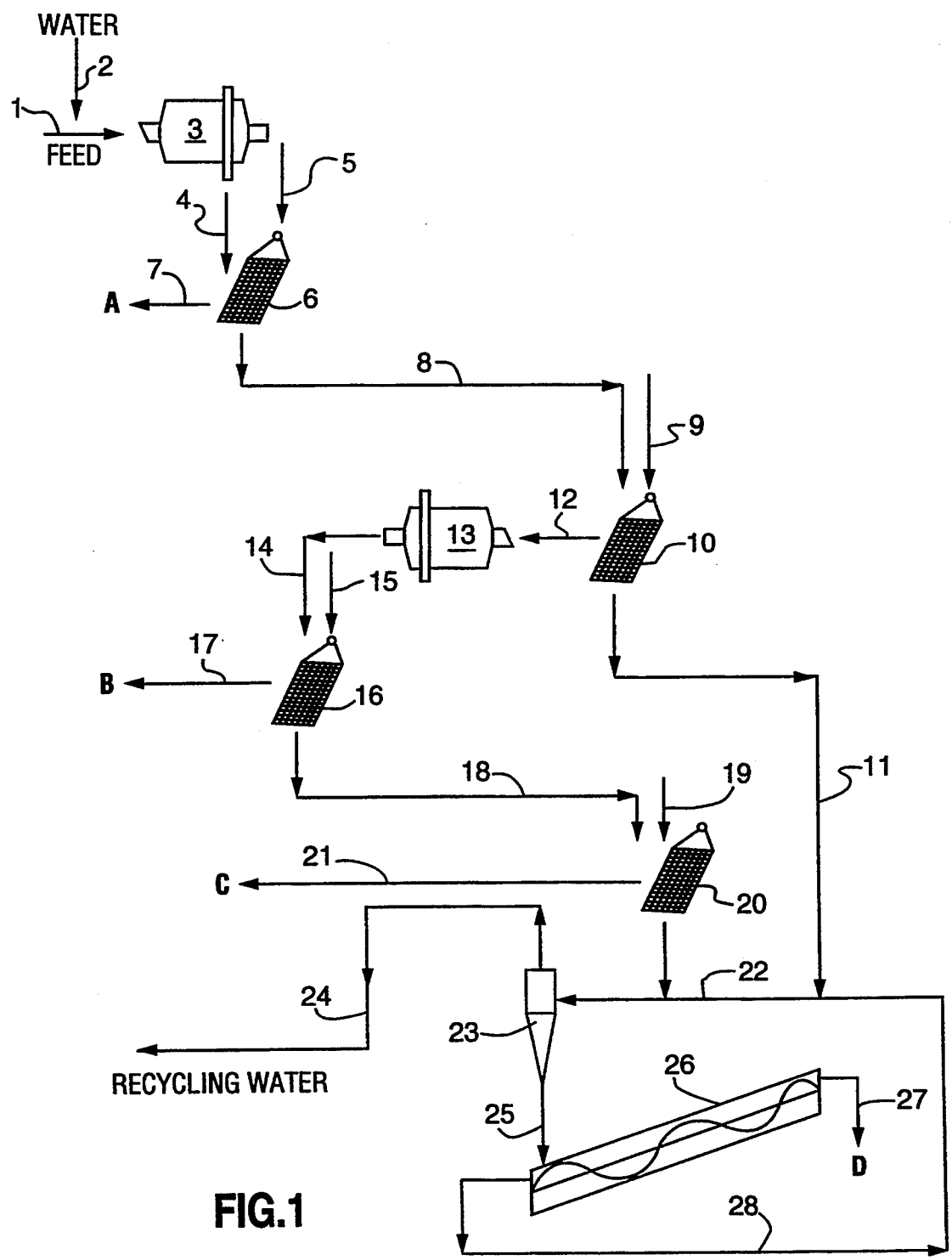
FIG. 1 shows a schematic flow sheet for an embodiment of the invention in which two wet grinding steps are used.

Referring first to FIG. 1 a flow sheet is given for a process in which two wet grinding stages are used in a continuous process. The metal containing dross or slag material, usually largely below about 12.5 mm in size is fed in through line 1, and the desired amount of water through line 2, to the first wet mill 3. In this instance, as the dross material particles were about 12.5 mm in size, a rod mill with peripheral end discharge was used. The material and water flow rates, and the mill rotation rate, are arranged to give both an adequate residence time in the mill, and an adequate level of comminution.

The ground material leaves the wet mill 3 through line 4, and together with additional water from line 5, goes to the screen 6. In this case, a vibratory screen was used. The solids retained by the screen represents a first metalliferous product fraction A, which is removed through line 7. This product is generally useable as it is obtained, or it can be dewatered further if desired before use.

The material passing the screen 6 in line 8 is fed, together with further water from line 9, to a second vibratory screen 10. The fines material passing this screen is rejected directly through line 11 to the tailings separation unit, which is described below. The material not passing the screen 10 is fed through line 12 to the wet mill 13. In this instance, a ball mill was used, with axial feed and discharge, as the material passing the screen 10 is small enough to handle this way.

The reground material leaves the second wet mill 13 in line 14 and is passed, together with further water from line 15, to the third vibratory screen 16. The solids retained by the screen 16 represent a second useable fraction B, and are removed through line 17. This material too can be used directly, or, if desired, subjected to a further dewatering step.

The material passing the screen 16 in line 18 still contains useful metalliferous particles, which are larger than the finely ground materials deriving from the drosses. These solids, together with further water from line 19, are passed to a fourth vibratory screen 20. The solids retained by the screen represent a third metalliferous product C, which is removed through line 21. Again, this product can be used directly, or, if desired, subjected to a further dewatering step. The reject fines material passing the screen 20 is passed in line 22 to join with the earlier reject fines in line 11 and thence to the tailings separation unit.

In the tailings separation, the first step is to pass the slurry through a hydrocyclone 23, in which most of the water is separated and leaves through line 24, for example to be recycled as process water. The wet solids from the hydrocyclone are passed through line 25 to a spiral classifier 26. The sand tailings D leaving the classifier in line 27 are rejected for disposal, and the water leaving the classifier in line 28 is returned to the hydrocyclone.

EXAMPLE

Using the scheme set out in the flow sheet, a sample of iron ladle residues was processed. A typical chemical analysis for the feed material is as follows, in percentages by weight:

| | |
|---|---|
| Total Fe: | 46.7% |
| Metallic Fe: | 18.9% |

|  | -continued |
|---|---|
| FeO: | 6.3% |
| TiO$_2$ | 12.3% |
| SiO$_2$ | 6.9% |
| MgO: | 1.8% |
| CaO: | 9.0% |
| Remainder: | to 100.0%* |

*chiefly MnO, Na$_2$O, Al$_2$O$_3$, Cr$_2$O$_3$ and V$_2$O$_5$.

This material was fed at a rate of 100 kg/hr to a rod mill with peripheral end discharge. Water was also added to the mill so that it operated at 60% solids. The mill was 510 mm ID and 815 mm long, containing 91 kg of 10 mm to 50 mm diameter high carbon steel rods.

The slurry leaving the mill was discharged onto a Sweco vibratory screen with 1,700 mm openings. The screen was sprayed with water, as needed, to facilitate screening. The +1,700 mm material retained by the screen was diverted as a first product fraction.

The slurry passing through the 1,700 mm screen was passed onto a screen with 0,425 mm openings. The slurry passing the screen was sent directly to the tailings unit. The +0,425 mm material was fed to the second wet grinding stage, in a ball mill, as a slurry containing about 50% solids, at a solids feed rate of about 25 kg/hr. About 20 1/hr water was added to the mill feed. The mill was a conventional axial feed and overflow outlet type 340 mm ID and 700 mm long, containing 91 kg of 15 to 30 mm diameter balls. A suitable ball material is forged or rolled high-carbon steel, or forged, rolled or cast alloy steel. The reground residues were fed to two screens in sequence, enough water being sprayed onto the screen in each case to facilitate screening. In both cases, vibratory screens were used. In the first screen, the screen had 0.425 mm openings. The +0.425 mm material from the screen was retained as a second product fraction, and the slurry passing through the screen went to the second one, with 0.300 mm openings. The +0.300 mm material was retained as a third product fraction, and the −0.300 mm slurry passed to the tailings unit for treatment to separate the solids, and to provide a recycle water for re-use.

Analysis of these three products of different size ranges gives the following results, in terms of proportion of the original feed, metallic Fe content (in percentages by weight), and metallic Fe distribution:

| Sample | % of Feed by weight | % Fe metal | % Fe distribution |
|---|---|---|---|
| Feed | 100 | 19.8 | 100 |
| +1.700 mm | 8.7 | 82.9 | 36.6 |
| +0.425 mm | 7.7 | 80.3 | 31.4 |
| +0.300 mm | 5.4 | 43.0 | 11.7 |
| −0.300 mm | 78.2 | 5.1 | 20.3 |

From this analysis it follows that combining the +1.700 mm and 0.425 mm it is possible to obtain a high grade product containing about 81% metallic iron representing some 67% of the metallic iron present in these ladle residues. This high grade product corresponds to some 15% by weight of the original material. The +0,300 mm fraction will provide a lower grade product containing about 43% metallic iron, representing some 11% of the metal present originally. This lower grade product corresponds to some 5% by weight of the original material. These two products together represent only some 20% or so of the original material, and yet they contain nearly 80% of the metallic iron in that material.

The water content of these three product fractions was also relatively low, being respectively about 4.6%, 15.1%, and 22.0%, by weight, respectively. These concentrates can be used as is, or conveniently can be stored in the open to drain further.

In this example, two wet milling stages were used, and this was found to be satisfactory. However, it is contemplated within this invention that more than two stages might be used, for example if a screen with openings larger than 0.425 mm had been used to follow the first wet mill a third wet mill would likely be needed. As is pointed out above, the wet milling conditions need to be chosen with care, so that flow through the mill can be maintained with the larger material. Depending on the material being processed, more than one peripheral discharge mill might be needed.

We claim:

1. A process for recovering metallic iron from a feed material comprising ferrous metal values present in particles of furnace slags, and drosses having a size below about 12.5 mm, which process comprises:
   (a) feeding the metallic iron containing feed material and an effective amount of water to a grinding mill to provide a first slurry;
   (b) subjecting the first slurry to wet milling in a first grinding mill for a time sufficient both to provide a first part and a second part, wherein the first part comprises at least a first proportion of the metallic iron present converted into flattened metallic iron particles, and the second part comprises the remainder of the feed material comminuted into particles smaller than the first proportion of flattened particles;
   (c) discharging the ground slurry from the mill;
   (d) separating the first proportion of flattened metallic iron particles from the solids in the ground slurry by at least a first screening step, to provide at least a first metal product fraction and a first reject fraction having a reduced level of contained metallic iron;
   (e) subjecting the first reject fraction to steps (a) through (d) in a second wet grinding mill and obtaining from a second screening step a second metal product fraction and a second reject fraction;
   (f) repeating step (e) to provide further metal product fractions until the metallic iron level in the reject fraction is reduced below a desired level; and
   (g) subjecting the reject fraction from step (f) to a further screening step to provide a last metal product fraction and a reject residue.

2. A process according to claim 1 operated continuously, wherein each of the wet grinding mills are constructed and arranged to discharge flattened metal product particles continuously to the screens used in the screening steps.

3. A process according to claim 1 wherein the metallic iron content of the last reject fraction is less than about 5% by weight.

4. A process according to claim 1 wherein the combined metal product fractions contain at least about 80% by weight of metallic iron.

5. A process according to claim 2 wherein at least the first wet grinding mill used in step (b) is chosen from the group consisting of peripheral discharge and radial discharge mills.

6. A process according to claim 5 wherein the first wet grinding mill is a peripheral end discharge mill.

7. A process according to claim 6 wherein the peripheral discharge mill is a rod mill.

8. A process according to claim 2 wherein the second wet grinding mill used in step (e) is an axial feed and discharge mill.

9. A process according to claim 2 wherein the second wet grinding mill used in step (e) is chosen from the group consisting of rod mills and ball mills.

10. A process according to claim 9 wherein the second wet grinding mill is a ball mill.

11. A process according to claim 1 wherein in step (d) two screening steps are used, wherein the earlier of the two has larger screen size openings than the later; the reject fraction of the earlier is rescreened in the later; the first metal product fraction comprises materials retained by both screens; and the reject from the later screen is the first reject fraction processed in step (d).

12. A process according to claim 1 wherein the metallic iron is chosen from the group consisting of iron, ferrous alloys, and mixtures thereof.

* * * * *